United States Patent

Price et al.

[11] Patent Number: 5,071,048
[45] Date of Patent: Dec. 10, 1991

[54] FISHING ROD AND REEL CARRIER

[76] Inventors: Robert Price, 2451 N. Burling, Chicago, Ill. 60614; Dan Vondran, 5025 Winnemac, Chicago, Ill. 60630

[21] Appl. No.: 564,419

[22] Filed: Aug. 8, 1990

[51] Int. Cl.⁵ .................................................. A45F 3/14
[52] U.S. Cl. ................................... 224/207; 224/247; 224/249; 224/922; 294/159
[58] Field of Search ............... 224/200, 202, 205, 207, 224/247, 249, 257, 258, 916, 922; 294/159, 161, 164; 211/70.2, 70.8

[56] References Cited

U.S. PATENT DOCUMENTS

| | | | |
|---|---|---|---|
| 2,024,484 | 12/1935 | Smith | 294/159 X |
| 2,419,175 | 4/1947 | Spohrer | 211/70.2 |
| 2,791,255 | 5/1957 | Ogden | 294/159 X |
| 3,674,190 | 7/1972 | Wright | 224/922 X |
| 4,311,262 | 1/1982 | Morin | 234/922 X |
| 4,331,357 | 5/1982 | Contreras | 284/159 X |

Primary Examiner—Henry J. Recla
Assistant Examiner—Robert M. Fetsuga

[57] ABSTRACT

A fishing rod and reel carrier is formed of a flexible handle plate with apertures for accepting the handle portion of one or more fishing rods, and a flexible tip plate with apertures for accepting the tips of such rods. The apertures are sized to accommodate any combination of conventional rods and reels. The two plates are held together by a flexible strap.

8 Claims, 1 Drawing Sheet

FISHING ROD AND REEL CARRIER

BACKGROUND OF THE INVENTION

The present invention relates to a carrier for one or more fishing rods and reels, and more particularly to a carrier by which a limited number of fishing rods and reels, with attached reels, can be stored and/or transported safely and conveniently.

A number of carriers for fishing rods and reels have been developed in the past, including those disclosed in Wright U.S. Pat. No. 3,674,190, and Morin U.S. Pat. No. 4,311,262. While these carriers are effective to perform the function of supporting a number of fishing rods and reels, the structure involved by which this function is achieved is relatively complicated and adds greatly to the weight and expense of the carrier.

It is, therefore, desirable to provide an improved fishing rod and reel carrier for carrying out the functions of storing and transporting a fishing rod and reel and which has a simpler and more economical construction.

It is another object of the present invention to provide such a fishing rod and reel carrier in which the elements of the carrier have a minimum amount of weight, so that the weight of the entire assembly including the fishing rods and reels and the carrier is very little more than the weight of the fishing rods (with reels) themselves.

It is a further object of the present invention to provide a fishing rod and reel carrier so constructed such that the carrier, without fishing rods and reels, occupies very little volume, and can be readily packaged in a small package for distribution and sale to users.

These and other objects of the present invention will become manifest by inspection of the following description on the accompanying drawings.

SUMMARY OF THE INVENTION

In one embodiment of the present invention there is provided a carrier having a flexible handle plate, and a flexible tip plate, a flexible strap interconnecting said plates, said handle plate having a plurality of apertures for accepting the handles but not the reels of a plurality of fishing rods and reels, and said tip plate having a plurality of apertures for accepting the tips of a plurality of fishing rods and reels, said plates being held apart from each other by projections on said fishing rods and reels adjacent the handle plate and the tip plate, whereby said fishing rods and reels can be readily stored and carried by means of said strap.

DESCRIPTION OF THE DRAWINGS

Reference will now be made to the accompanying drawings, in which.

DESCRIPTION OF THE PREFERRED EMBODIMENT

Figure 1:
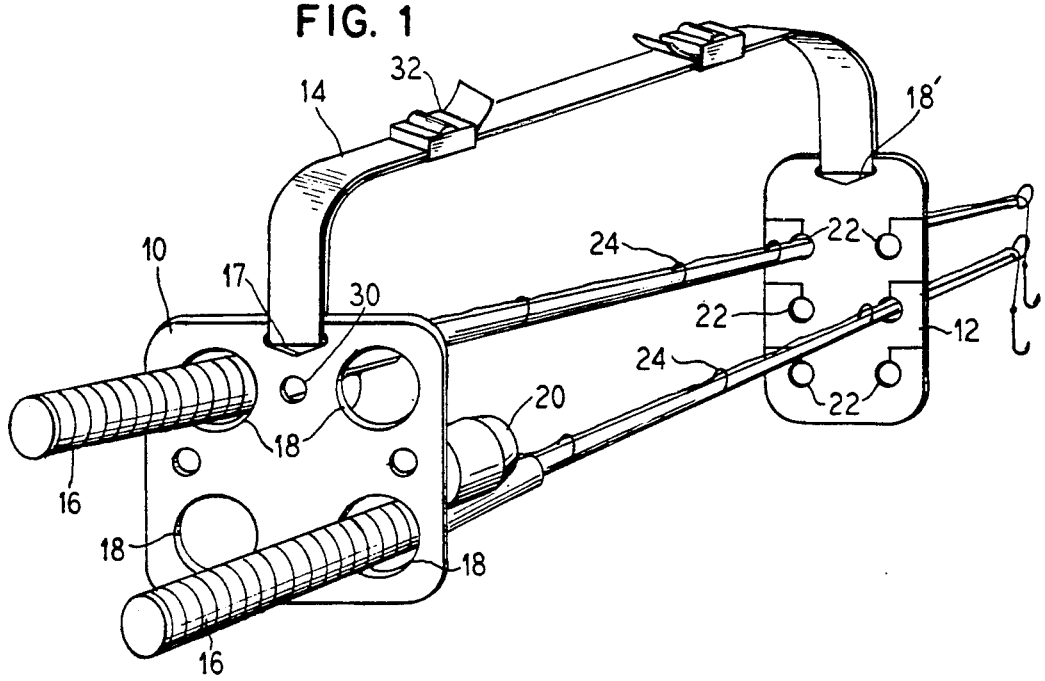
FIG. 1 is a perspective view of the carrier of the present invention assembled with two fishing rods and reels to allow such fishing rods and reels to be conveniently transported and/or stored.

Referring now to FIG. 1, a fishing rod and reel carrier embodying the present invention as illustrated, is association with two fishing rods each having a reel. The carrier has a handle plate 10 and a tip plate 12, interconnected by a flexible strap 14. The strap is engaged in an aperture 17 in the handle plate 10, and the corresponding aperture 18' in the tip plate 12. The handle 16 of a pair of fishing rods and reels are received in two apertures 18 out of four apertures 18 which are equally spaced in the handle plate 10. The apertures 18 are of sufficient size to receive a handle 16, but are of insufficient size to allow the reels 20 attached to the fishing rods and reels to pass through the apertures 18.

The tip plate 12 has a plurality of apertures 22 which are of sufficient size to receive the thin portion of the fishing rods, but are insufficient to allow the line guides 24 attached to the rods to pass through.

The strap 14 is flexible, and when the assembly including the plates 10 and 12 in the fishing rods and reels are lifted or carried by means of the strap 14, the strap 14 is under tension, tending to pull together the plates 10 and 12. However, the plates 10 and 12 cannot move closer than the condition illustrated in FIG. 1, where the handle plate 10 is blocked by the reels 20, and the tip plate 12 is blocked by the line guides 24.

The assembly is held together in fully assembled condition by virtue of the tension of the strap 14, which always urges the plates 10 and 12 together and prevents either of them from sliding off either end of the fishing rod and reel.

Any fishing rod and reel may be readily moved from the assembly illustrated in FIG. 1 by releasing the tension on the strap, and manually pulling the reel portion of the fishing rod away from the handle plate 10, thereby withdrawing the handle 16 from the aperture 18. Thereafter, the thin portion of the rod may be disengaged from the aperture 22. Alternatively, the thin part of the rod may first by disengaged from the aperture 22, and the rod pulled directly out of its assembled relationship with the handle plate 10.

Figure 2:
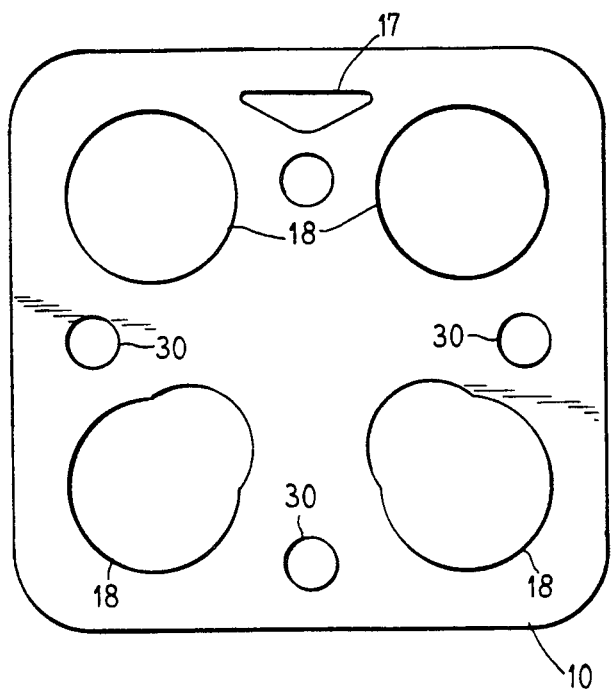
FIG. 2 is a plan view of the handle plate portion of the carrier.

FIG. 2 illustrates a plan view of the handle plate 10, with the apertures 18, and the aperture 17 for the strap. The handle plate 10 is formed of flexible material, and is preferably a synthetic rubber material which has a stiffness sufficient to prevent the apertures 18 to become enlarged by stretching far enough to pass an average size reel 20. Preferably the handle plate 10 is, although flexible, rigid enough to allow the assembly to be maintained in an upright position, as shown, when resting on an horizontal surface. In other words, the handle plate 10 can support the weight of the fishing rods assembled therewith, while still maintaining a relatively upright assembled condition as shown in FIG. 1, thus holding the assembled fishing rods apart from each other and preventing abrasion or other damage which may occur if the rods or reels were allowed to contact each other. On the other hand, the handle plate 10 is sufficiently flexible, to prevent any injury to the rods or reels due to contact with the handle plate 10, and also to provide a shock absorbing function which tends to insulate the rods and reels from shock due to sudden lifting or setting down the assembly, or shocks resulting from transportation of the assembly in a vehicle or the like.

A shown in FIG. 2, two of the apertures 18 are round and the other two have elongated shapes, which can better accommodate fishing rods with irregularly shaped handles.

Figure 3:
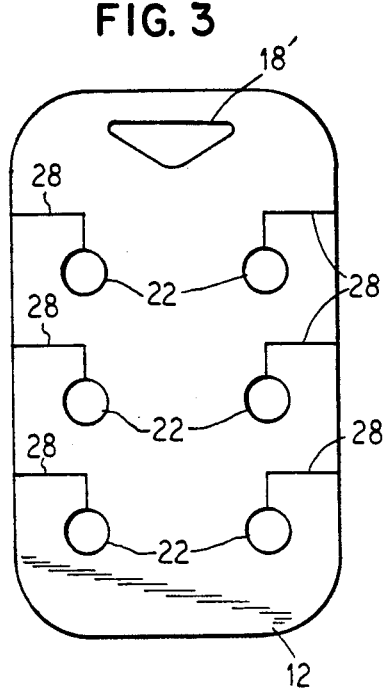
FIG. 3 is a plan view of the tip plate of the carrier.

A plan view of the tip plate 12 is illustrated in FIG. 3, where six apertures 22 are illustrated. An L-shape cut or slit in the tip plate 12 is provided for each of the apertures 22, and the tip of the rod may be inserted in any one of the apertures 22 by manually deforming the plate 12 so as to open up a space defined by the slits 28 sufficiently large to accommodate the diameter of the rod. The apertures 22 are sized to be slightly larger than the thin portion of the rod, so that the rods fit relatively loosely within the apertures 22. The rods may be removed by manually deforming the tip plate 12 to open up a channel along the path of the slits 28 sufficient to pass the diameter of the slender or thin portion of the rod. The diameter of the apertures 22 are not sufficient, however, to enable the line guides 22 to pass therethrough.

The material of which the tip plate 12 is made, is preferably the same as the handle plate 10. It must be sufficiently flexible to allow easy deformation to allow entry and exit of the rods through the slits 28, but should be rigid enough to support the rods assembled therewith in the condition illustrated in FIG. 1. After insertion of the rods, the plate returns to it original form and locks the rods in place. In other words, the tip plate 12 must be stiff enough to support itself in upright condition, even when assembled with a full complement of rods.

If desired, for extra long rods, a central portion of the rod may be engaged in one of the apertures 22, and then the tip of the rod bent back in an arc with the extreme tip end thereof engaged in a separate one of the apertures 22. This allows rods which are extremely long and flexible to be carried in a more compact assembly, without adding to the complexity of the rod carrier. To accommodate this feature, the number of apertures 22 is larger than the number of apertures 18. In the example illustrated, there are four apertures 18 in the handle plate 10, and six apertures 22 in the tip plate 12.

Four additional apertures 30 are also provided in the handle plate 10 and these are provided to accommodate sections of rods which are adapted to be disconnected into a number of connectible sections. In that case, the handle portion of such a rod is stored with its handle engaged in one of the larger apertures 18, as shown in FIG. 1, and the opposite end of the first rod section is received in one of the apertures 22 of the tip plate 12. One end of each rod section may be inserted into one of the apertures 30, with the opposite end thereof held in place by one of the apertures 22 of the tip plate 12. The line guides 24 at opposite ends of each section maintain the rod sections in assembled condition relative to the handle plate and tip plate.

The strap 14 is preferably about 1 meter or about 40 inches long, and may be made of any flexible material. If it is desired for the length of the strap 14 to be adjustable, the strap may be looped through either or both of the apertures 16 and 17, with an end thereof connected to a buckle of clasp 32, which is slidable on the strap 14 in order adjust the length. For either end for which an adjustment is not desired, the strap may be simply looped through the apertures 16 or 17 and sewed or otherwise fixed to the body of the strap 14.

It will apparent from the foregoing that the present invention provides a simple and economical apparatus for storing and carrying a plurality of fishing rods and reels, and for maintaining them in spaced apart condition, to insure against tangling or damage which may be caused by their contact with each other. In addition, the assembled rods are protected from shock, and the portions of the carrier have very little weight due to their thinness, and the lightweight materials of which they are constructed. In addition, they have very little volume and so can be readily packaged in a flat package with dimensions not much larger than those of the base plate 10, and with a thickness not much larger than a combined thickness of the plates 10 and 12 plus one or two thicknesses of the strap 14, which may be wound around the plates 10 and 12 to form a compact package.

In a preferred embodiment, the base plate is about 150 mm or 6 inches square, preferably 6 inches and the tip plate is about 50 mm by 100 cm or 2 inches by 4 inches. Each is formed of thermoplastic rubber material with a thickness of about 3 mm or 1/8 inch and a hardness of about 70 to 80 diameters. The handle apertures are about 38 mm or 1½ inches in diameter and the rod tip aperture are about 12 mm or ½ inches in diameter. The overlapping handle apertures are about 19 mm or ¾ inches in diameter. The handle apertures are spaced apart with about 7 to 8 cm between the centers, and the rod tip apertures are spaced apart to form two rows of three apertures each spaced with their centers are about 19 mm apart, with the rows spaced with centers of corresponding apertures about 43 mm apart.

It will be apparent that various modifications and additions may be made in the present invention without departing from the essential features of novelty thereof, which are intended to be defined and secured by the appending claims.

What is claimed is:

1. A fishing rod and reel carrier comprising a handle plate and a tip plate connected by a flexible strap, said handle plate having a plurality of apertures adapted to receive a handle of a fishing rod but of insufficient size to pass a reel attached thereto, said fishing rod having a rod portion attached to said handle with line guides thereon, and said tip plate having a plurality of apertures each adapted to receive said rod portion of a fishing rod, but of insufficient size to pass said line guides, said plurality of apertures in said tip plate having slits interconnecting the apertures with an edge of the plate, said tip plate being formed of material which is sufficiently flexible to allow it to be deformed by manual pressure to allow insertion of a fishing rod into the apertures through said slits.

2. Apparatus according to claim 1, wherein said handle plate and said tip plate are formed of thin flexible material which is self supporting to support the weight of said fishing rods with attached reels in assembled condition and remain in a vertical attitude when supported at the bottom edge of said plates.

3. Apparatus according to claim 1, wherein said tip plate material is rigid enough to resume its planar condition and to lock the rod securely in position after a rod has been thus inserted.

4. Apparatus according to claim 1, wherein said tip plate is formed of a flexible material having sufficient rigidity to maintain an upright, generally vertical, position, when said tip plate is assembled with one or more fishing rods and supported on a surface with the bottom of said tip plate resting on said surface.

5. A fishing rod and reel carrier comprising a handle plate and a tip plate interconnected only by a flexible strap, said handle plate having a plurality of apertures adapted to receive a handle of the fishing rod but of insufficient size to pass a reel attached thereto, said fishing rod having a rod portion attached to said handle and said tip plate having a plurality of apertures adapted to receive said rod portion of said fishing rod, said carrier being adapted to be supported by said flexible strap, whereby tension of said flexible strap serves to tend to pull said handle plate and said tip plate toward each other, said plurality of apertures in said tip plate having slits interconnecting the apertures with an edge of the plate, said tip plate being formed of material which is sufficiently flexible to allow it to be deformed by manual pressure to allow insertion of a fishing rod into the apertures through said slits.

6. Apparatus according to claim 5, wherein said handle plate and said tip plate are formed of a thin flexible material which is self-supporting to support the weight of said fishing rods with attached reels in assembled condition and remain in a vertical attitude when supported at the bottom edge of said plates.

7. Apparatus according to claim 5, wherein said tip plate is formed of a flexible material having sufficient rigidity to maintain an upright, generally vertical, position, when said tip plate is assembled with one or more fishing rods and supported on a surface with the bottom of said tip plate resting on said surface.

8. Apparatus according to claim 5, wherein said tip plate material is rigid enough to resume its planar condition and to lock the rod securely in position after a rod has been thus inserted.

* * * * *